(12) United States Patent
Ewers et al.

(10) Patent No.: US 12,111,018 B2
(45) Date of Patent: Oct. 8, 2024

(54) METHOD AND DEVICE FOR ASSISTING FILLING WITH HYDROGEN

(71) Applicant: Bayerische Motoren Werke Aktiengesellschaft, Munich (DE)

(72) Inventors: Marcel Ewers, Dachau (DE); Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 207 days.

(21) Appl. No.: 17/910,519

(22) PCT Filed: Feb. 15, 2021

(86) PCT No.: PCT/EP2021/053632
§ 371 (c)(1),
(2) Date: Sep. 9, 2022

(87) PCT Pub. No.: WO2021/180426
PCT Pub. Date: Sep. 16, 2021

(65) Prior Publication Data
US 2023/0135470 A1    May 4, 2023

(30) Foreign Application Priority Data
Mar. 11, 2020    (DE) .................... 10 2020 106 622.8

(51) Int. Cl.
*F17C 5/06*    (2006.01)
(52) U.S. Cl.
CPC .......... *F17C 5/06* (2013.01); *F17C 2221/012* (2013.01); *F17C 2223/0123* (2013.01);
(Continued)
(58) Field of Classification Search
CPC .................. F17C 5/06; F17C 2221/012; F17C 2223/0123; F17C 2225/0123;
(Continued)

(56) References Cited

U.S. PATENT DOCUMENTS

| 7,797,090 B2 * | 9/2010 | Zanardelli | G07C 5/008 |
| | | | 701/31.4 |
| 9,016,329 B2 | 4/2015 | Mori | |

(Continued)

FOREIGN PATENT DOCUMENTS

| DE | 102 41 688 A1 | 5/2003 |
| DE | 11 2005 002 730 T5 | 1/2008 |

(Continued)

OTHER PUBLICATIONS

PCT/EP2021/053632, International Search Report dated May 31, 2021 (Two (2) pages).

(Continued)

*Primary Examiner* — Timothy L Maust
*Assistant Examiner* — Christopher M Afful
(74) *Attorney, Agent, or Firm* — Crowell & Moring LLP

(57) ABSTRACT

A refuelling assistance device that determines one of the following scenarios: (a) that consecutive refuelling operations of a first vehicle at corresponding different fuel stations have taken place without a communication link, and (b) that consecutive refuelling operations at a first fuel station for corresponding different vehicles have taken place without the communication link. In response to determining scenario (a), the control unit causes a communication module of the first vehicle to be checked for establishment of the communication link. In response to determining scenario (b), the control unit causes a communication module of the first fuel station to be checked for establishment of the communication link.

9 Claims, 1 Drawing Sheet

(52) U.S. Cl.
CPC ............... *F17C 2225/0123* (2013.01); *F17C 2250/032* (2013.01); *F17C 2250/034* (2013.01); *F17C 2250/043* (2013.01); *F17C 2250/0439* (2013.01); *F17C 2270/0184* (2013.01)

(58) Field of Classification Search
CPC .......... F17C 2250/032; F17C 2250/034; F17C 2250/043; F17C 2250/0439; F17C 2270/0184
USPC .......................................................... 141/1
See application file for complete search history.

(56) References Cited

U.S. PATENT DOCUMENTS

| | | | |
|---|---|---|---|
| 9,114,781 B2 | 8/2015 | Wake et al. | |
| 2004/0039504 A1* | 2/2004 | Coffee | B60P 3/03 701/482 |
| 2012/0267002 A1 | 10/2012 | Kittilsen et al. | |
| 2018/0376357 A1* | 12/2018 | Tavares Coutinho | H04W 64/003 |

FOREIGN PATENT DOCUMENTS

| | | |
|---|---|---|
| DE | 11 2010 004 462 T5 | 8/2012 |
| DE | 10 2013 204 632 A1 | 9/2013 |
| DE | 10 2014 205 394 A1 | 10/2014 |
| DE | 10 2018 210 961 A1 | 1/2020 |
| JP | 2016-8686 A | 1/2016 |

OTHER PUBLICATIONS

German Search Report issued in German application No. 10 2020 106 622.8 dated Nov. 4, 2020, with Statement of Relevancy (Seven (7) pages).

"Fueling Protocols for Light Duty Gaseous Hydrogen Surface Vehicles", *SAE J2601*, Dec. 6, 2016, 267 pp.

"Hydrogen Surface Vehicle to Station Communications Hardware and Software", *SAE J2799*, Dec. 13, 2019, 33 pp.

* cited by examiner

METHOD AND DEVICE FOR ASSISTING FILLING WITH HYDROGEN

CROSS REFERENCE TO RELATED APPLICATION

This application is a 371 of International Application No. PCT/EP2021/053632, filed Feb. 15, 2021 which claims priority under 35 U.S.C. § 119 from German Patent Application No. 10 2020 106 622.8, filed Mar. 11, 2020, the entire disclosure of which is herein expressly incorporated by reference.

BACKGROUND AND SUMMARY OF THE INVENTION

The technology disclosed here relates to a method and a corresponding device that assist a user of a vehicle when refueling with hydrogen.

An electrically driven vehicle can comprise a fuel cell that is designed to generate electrical energy for an electric drive motor of the vehicle on the basis of hydrogen. The vehicle comprises a hydrogen pressure tank that is designed to be filled with hydrogen up to a certain filling pressure (e.g. up to 700 bar). The range of the vehicle depends on the amount of hydrogen that is filled into the hydrogen pressure tank in a refueling operation, with the amount of hydrogen in turn depending on the filling pressure to which the hydrogen pressure tank is filled in the refueling operation.

The filling pressure in a refueling operation typically depends on properties of the vehicle and/or the hydrogen fuel station. In this case, the filling pressure can be reduced due to limitations on the side of the vehicle and/or the hydrogen fuel station, which in turn leads to a reduced range of the vehicle and thus to reduced comfort for a user of the vehicle.

It is one preferred object of the technology disclosed herein to reduce or eliminate at least one disadvantage of a previously known solution or to propose an alternative solution. In particular, it is one preferred object of the technology disclosed herein to assist a user of a vehicle when refueling with hydrogen and/or to increase the quality of hydrogen refueling. Other preferred objects can arise from the advantageous effects of the technology disclosed herein. The object is achieved by the subject matter of the independent claims. The dependent claims represent preferred embodiments.

According to one aspect, a device for assisting in refueling of a pressure tank of a (motor) vehicle with fuel is described. The device can form part of the vehicle, part of the fuel station for a refueling operation for refueling the pressure tank and/or part of a central unit (e.g. a backend server) for a network of fuel stations. The device can be designed to assist refueling in such a way that when refueling, whenever possible, or as often as possible, the maximum possible amount of fuel (in particular $H_2$, or hydrogen) can be filled into vehicles' pressure tanks.

The device is configured to determine whether a refueling operation for refueling the pressure tank at a fuel station has taken place with or without a communication link between the vehicle and the fuel station. The communication link between the vehicle and the fuel station can allow communication according to the SAE J2601 standard and/or the SAE J2799 standard. Alternatively or additionally, the communication link between the vehicle and the fuel station can comprise, in particular be, an infrared communication link. In particular, the SAE J2601 standard can specify infrared communication used between the vehicle and the fuel station. The communication link can potentially be limited to a communication direction from the vehicle to the fuel station.

Where applicable, the communication connection can comprise one or more other forms of data transmission (such as Bluetooth or Wi-Fi) in addition to infrared communication, which can be used, for example, to transmit the vehicle identifier and/or position data.

It can thus be determined whether COM refueling or non-COM refueling of the pressure tank of the vehicle has taken place at the fuel station. In the case of refueling with a communication connection (i.e. COM refueling), the filling pressure of the pressure tank (and thus also the fuel filling quantity effected) is typically higher than when refueling without a communication connection (i.e. non-COM refueling), e.g. by 5% or more, or by 10% or more. Non-COM refueling can therefore lead to a reduced filling level of the pressure tank and thus to a reduced range of the vehicle.

The device is also configured, depending on whether refueling has taken place with or without communication, to effect a measure for a subsequent refueling operation. In particular, the device can be configured to effect a measure for a subsequent refueling operation if it is determined that refueling has taken place without a communication connection. Exemplary measures are: initiating a check of a communication module for establishment of the communication connection with respect to the vehicle and/or the fuel station; and/or updating a database indicative of a status of the fuel station.

The device thus makes it possible to detect a limitation for a vehicle (e.g. a (any) first vehicle from a plurality of different vehicles) and/or a fuel station (e.g. a (any) first fuel station from a plurality of different fuel stations) resulting in the filling level of a pressure tank in a refueling operation, and thus the range of a vehicle, being limited. Furthermore, the device allows the limitation to be corrected promptly in order to bring about the maximum possible filling level in subsequent refueling operations. In this way, the refueling quality for pressure tanks can be reliably increased.

The device can be configured to determine that a plurality of consecutive operations of refueling the pressure tank of the vehicle (in particular the first vehicle from the plurality of different vehicles) at a corresponding plurality of different filling stations have taken place without a communication connection. This can be taken as an indication that the vehicle's communication module is impaired. In response thereto, it can be brought about for the communication module of the vehicle to be checked for establishment of the communication connection, and in particular repaired or replaced. In this way, the quality of the vehicle's refueling operations can be increased in a timely manner.

Alternatively or additionally, the device can be configured to determine that a plurality of consecutive refueling operations at the fuel station (in particular at the first fuel station from the plurality of different fuel stations) for the pressure tanks of a corresponding plurality of different vehicles have taken place without a communication link. This can be taken as an indication that the station's communication module is impaired. In response thereto, it can be brought about for the communication module of the fuel station to be checked for establishment of the communication connection, and in particular repaired or replaced. In this way, the quality of refueling operations at the fuel station can be increased in a timely manner.

The device can be configured to determine pressure data relating to the filling pressure of the pressure tank following the refueling operation. Furthermore, the device can be configured to determine temperature data relating to the temperature of the fuel in the pressure tank (in particular the temperature of the fuel following the refueling operation).

It can then be accurately determined on the basis of the pressure data and/or on the basis of the temperature data whether or not a refueling operation has taken place with or without a communication link between the vehicle and the fuel station. In particular, it can be detected that a refueling operation has taken place without a communication connection if the filling pressure is lower (e.g. lower by 5% or more) than a maximum allowable pressure for a refueling operation.

The density of the fuel in the pressure tank can be determined on the basis of the pressure data and the temperature data. The SOC (state of charge) of the pressure tank can then be accurately determined from the density of the fuel in the pressure tank reached in the refueling operation. Based on the SOC, it can then be determined whether a refueling operation has taken place with a communication link (SOC>95%) or whether a refueling operation has taken place without a communication link (SOC<95%).

The device can be configured to determine whether a user and/or the fuel station prematurely terminated the refueling operation (and therefore the SOC of the pressure tank could not reach the 95% of the maximum allowable pressure). For this purpose, zero, one or more indicators of premature termination (before the maximum allowable pressure has been reached) can be determined. Exemplary indicators are:
   pressing an abort button (vehicle or fuel station side);
   an abort signal on the communication link (vehicle or fuel station side); and/or
   the fact that the filling pressure is well below the maximum allowable pressure, e.g. 80% or lower than the maximum allowable pressure.

On the basis of the zero, one or more detected indicators relating to premature termination of the refueling operation, the device can also be configured to determine whether a refueling operation for refueling the pressure tank at the fuel station has taken place with or without a communication link between the vehicle and the fuel station. By detecting and taking into account one or more indicators of premature termination of the refueling operation, it can be determined with increased accuracy whether a refueling operation has taken place with or without a communication link.

As already mentioned above, the device can form part of the vehicle. The device can be configured to receive refueling operation data relating to whether the refueling operation has taken place with or without a communication link between the vehicle and the fuel station from the fuel station or from a central unit for a network of fuel stations.

For this purpose, the device can be configured to determine an identifier of the vehicle, position data relating to the position of the fuel station and/or a time stamp relating to a point in time of the refueling operation. The refueling operation data can then be reliably requested from the fuel station or the central unit using the identifier, using the position data and/or using the time stamp. Providing refueling operation data can allow a vehicle to reliably detect an impairment of the vehicle's communication module.

The fuel station can comprise one or more fuel station sensors which are configured to collect sensor data relating to the fuel, in particular relating to the pressure and/or the quantity of fuel that is provided in the refueling operation. The one or more fuel station sensors can have a relatively high level of accuracy. In particular, the one or more fuel station sensors can be calibrated.

The vehicle can comprise one or more vehicle sensors which are configured to collect sensor data relating to the filling level and/or the filling pressure of the pressure tank. The device can be configured to check and/or calibrate the one or more vehicle sensors on the basis of the sensor data from the one or more fuel station sensors. In this way, the quality of refueling operations can be further increased.

According to a further aspect, described herein is a (road) motor vehicle (in particular a motor car or a truck or a bus) that comprises the device described herein.

According to a further aspect, described is a fuel station that comprises the device described herein.

According to a further aspect, a method for assisting in refueling a pressure tank of a (first) vehicle with (a gaseous or liquid) fuel is described. The method comprises determining whether a refueling operation for refueling the pressure tank at a (first) fuel station has taken place with or without a communication link between the (first) vehicle and the (first) fuel station. Furthermore, the method comprises, depending thereon, effecting a measure for a subsequent refueling operation (for the (first) vehicle and/or the (first) fuel station).

According to a further aspect, a software (SW) program is described. The SW program can be configured to be executed on a processor and thereby to carry out the method described herein.

According to a further aspect, a storage medium is described. The storage medium can comprise a SW program configured to be executed on a processor and thereby to carry out the method described herein.

It should be noted that the methods, devices and systems described herein may be used either on their own or in combination with other methods, devices and systems described herein. In addition, any aspects of the methods, devices and systems that are described herein may be combined with one another in a wide variety of ways. In particular, the features of the claims may be combined with one another in a wide variety of ways.

The invention is described more thoroughly below on the basis of exemplary embodiments, wherein

DETAILED DESCRIPTION OF THE DRAWINGS

Figure 1:
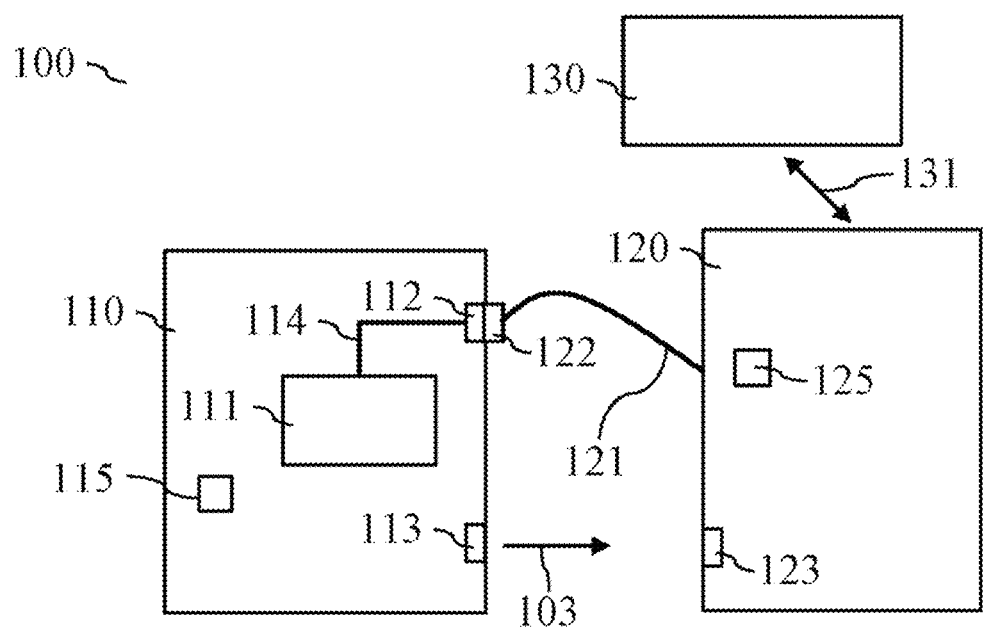
FIG. 1 shows an exemplary system for carrying out pressure refueling, in particular hydrogen refueling.

As explained at the outset, the present document is concerned with increasing the comfort and/or the reliability and/or the quality of pressure refueling of a pressure tank with a fuel, in particular with hydrogen. In this context, FIG. 1 shows an exemplary system 100 which comprises a vehicle 110 with a pressure tank 111 and a tank unit or a fuel station 120 for refueling the pressure tank 111 with a fuel (in particular with hydrogen, $H_2$). The fuel station 120 comprises a fuel hose 121, which can be connected to a coupling element 112 of vehicle 110 via a complementary coupling element 122 in order to create a fluid-tight, in particular gas-tight connection between the fuel hose 121 and a fuel line 114 of the vehicle 110 to the pressure tank 111. To refuel, fuel can be pumped from the fuel station 120 via the fuel hose 121 and via the fuel line 114 into the pressure tank 111.

The vehicle 110 can comprise a communication module 113 which is designed to exchange data relating to a refueling operation with a corresponding communication module 123 of the fuel station 120. A communication link 103 can thus be established between a vehicle 110 and a fuel station 120 in order to monitor a refueling operation. The communication can take place via an infrared (IR) interface.

The communication link 103 can be used to transmit pressure data relating to the pressure in the pressure tank 111 to the fuel station 120. The fuel station 120 can then operate the pump for filling the pressure tank 111 as a function of the pressure data, in particular in order to fill the pressure tank 111 with fuel up to a certain maximum pressure.

If no communication connection 103 can be established between the vehicle 110 and the fuel station 120, the filling pressure that is reached in a refueling operation is typically lower than the possible maximum pressure for safety reasons. In particular, in such a case (which is also referred to as non-COM refueling) a lower filling pressure is reached for the pressure tank 111 than in the case of refueling with data communication (also referred to as COM refueling), since the fuel station 120 can only estimate the actual filling pressure in the pressure tank 111 (as it is not communicated via the communication link 103 from the vehicle 110). The filling pressure reached in non-COM refueling can be, for example, about 5% or more, or 10% or more (e.g. 8%) below the possible maximum pressure. The reduced filling pressure leads to a reduced range for the vehicle 110.

A defect in and/or soiling of the communication module 113 of the vehicle 110 and/or the communication module 123 of the fuel station 120 can result in only non-COM refueling with reduced filling pressure and no COM refueling with maximum pressure being carried out.

For refueling with hydrogen or $H_2$, the aspects of COM refueling and non-COM refueling are defined in the SAE J2601 standard document. This standard document is incorporated herein by reference in its entirety. According to SAE J2601, COM refueling with maximum pressure only takes place if a valid data connection 103 has been established between the vehicle 110 and the fuel station 120. The aspects relating to the data link 103 are described in the SAE J2799 standard document, which is incorporated herein by reference in its entirety.

Non-COM (i.e. non-communication) refueling takes place when the data connection 103 between the vehicle 110 and the fuel station 120 cannot be established or when the data received by the fuel station 120 are not recognized as valid by the fuel station 120. A refueling operation may initially start as COM refueling, but switch to non-COM refueling if there is a problem with signal transmission during refueling. In this case, the fuel station 120 determines a new (reduced) target pressure for the refueling operation.

The system 100 can comprise a central unit 130 which is configured to communicate with the tank unit or fuel station 120 and/or with the vehicle 110 via a communication link 131. In particular, the central unit 130 can be configured to determine whether COM refueling or non-COM refueling has been carried out at a fuel station 120. Furthermore, the central unit 130 can determine for a plurality of different refueling operations (each with different vehicles 110) whether COM refueling or non-COM refueling has been carried out. Based on this data, it can be checked whether a fuel station 120 has a (permanent) defect in relation to the establishment of a communication link 103. This information can be communicated in order to inform the users of vehicles 110 whether only reduced refueling is possible at the fuel station 120 or whether full refueling is possible.

It can thus be detected, in particular at the end of an operation of refueling a pressure tank 111 (by the vehicle 110), whether non-COM refueling or COM refueling has been carried out (e.g. on the basis of the filling pressure in the pressure tank 110). This information can be stored in a database and, where applicable, taken into account in journey planning (for subsequent refueling, also for other vehicles).

The information relating to the type of refueling that has taken place (COM refueling or non-COM refueling) can be transmitted to the fuel station 120 via vehicle-to-infrastructure communication, in particular in order to cause an operator of the fuel station 120 to rectify the error (if it is a fuel station error). If the cause lies with the vehicle 110, a corresponding error entry can be stored in an error memory of the vehicle 110 in order to cause the error to be corrected as part of the maintenance for the vehicle 110.

A database relating to the type of refueling (COM or non-COM refueling), which is determined and updated by the central unit 130 for example, can allow a vehicle 110, for example, to determine whether the RDI (refueling data interface) signal transmitted by the communication module 113 of the vehicle 110 (e.g. via an infrared-based communication link 113) for a refueling operation has been successfully received by the fuel station 120. The RDI signal can be defined in the SAEJ2601 standard. If the signal was not received, and if it is detected that this is the case at multiple fuel stations 120, then it can be reliably concluded that the communication module 113 of the vehicle 110 is defective.

The comparison between a certain vehicle 110 and a refueling operation can be achieved, for example, by transmitting an identifier (ID) of the vehicle 110 to the fuel station 120 as part of the data communication 103 (e.g. the vehicle identification number, VIN). Alternatively or additionally, a first database for fuel stations 120 and a second database for vehicles 110 can be maintained, in which individual refueling operations are listed with a time stamp and/or with position data (e.g. GPS coordinates). A match between a vehicle 110 and a certain refueling operation at a certain fuel station 120 can thus be reliably established.

A database relating to the individual refueling operations at at least one fuel station 120 can allow a vehicle 110 to determine information regarding how much fuel was taken on in one refueling operation. Alternatively or additionally, this can be determined from an electronic invoice for a refueling operation (which can be assigned to a specific refueling operation via position data and/or a time stamp, for example).

The quantity information provided by the fuel station 120 relating to the quantity of fuel provided can be compared with the vehicle's own filling measurement (taking into account the accuracy of the filling measurement), e.g. in order to detect an error in a refueling operation. In a corresponding manner, the quantity information determined by the vehicle 110 can also be transmitted to the fuel station 120 or to the central unit 130. In this way, the quantity sensors of the vehicle 110 and of the fuel station 120 can be compared with one another. This is particularly advantageous for the calibration of the sensor 115 of a vehicle 110, since the sensor system 125 of a fuel station 120 is typically calibrated and can therefore be used as a reference for calibrating the sensor 115 of the vehicle 110. In particular, inaccuracy in the vehicle sensor 115 due to drift or aging can be detected and potentially compensated for.

The vehicle 110 can thus be configured to estimate the updated filling level of the pressure tank 111 online in a refueling operation on the basis of the currently present (measured) filling level of the pressure tank 111 and on the basis of the filling mass currently provided by the fuel station 120 and, where applicable, display it and/or use it in the calculation of the range of the vehicle 110. Furthermore, on the basis of the filling mass provided by the fuel station 120, the pressure or the temperature of the pressure tank 111 can be inferred via the density of the (gaseous) fuel.

The vehicle 110 can comprise one or more sensors 115 which are configured to collect sensor data relating to the filling level and/or the filling pressure of the pressure tank 111. Furthermore, the fuel station 120 can comprise one or more sensors 125 which are configured to record sensor data relating to the pressure of the fuel provided and/or relating to the amount of fuel provided. The one or more sensors 125 of the fuel station 120 are typically calibrated. The sensor data provided by the one or more sensors 125 of the fuel station 120 can thus be used to check and/or calibrate the one or more sensors 115 of the vehicle 110.

The database relating to a fuel station 120 can indicate
whether and, if applicable, in what period of time the fuel station 120 is being serviced and is therefore not available for refueling; and/or
whether the fuel station 120 is defective; and/or
whether the fuel station 120 allows non-COM fueling or COM fueling; and/or
position data relating to the position at which a vehicle 110 should stop in order to allow coupling of the coupling elements 122, 112 (e.g. for fully automatic refueling); and/or
statistical data on the utilization of the fuel station 120 and/or on the price trend for fuel at the fuel station 120.

The status of fuel stations 120 can thus be determined and updated (e.g. by the central unit 130). The database related to the status of fuel stations 120 can then be provided for refueling operations for vehicles 110.

Figure 2:
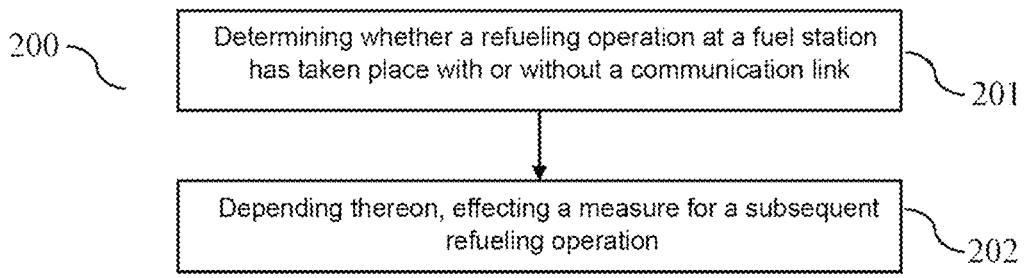
FIG. 2 shows a flowchart of an exemplary method for assisting a user when carrying out pressure refueling (e.g. with hydrogen).

FIG. 2 shows a flowchart of an exemplary (potentially computer-implemented) method 200 for assisting in the refueling of a pressure tank 111 of a vehicle 110 with fuel. The pressure tank 111 can in particular be refueled with $H_2$, or hydrogen. The method 200 can be carried out by the vehicle 110 and/or by the fuel station 120 at which a refueling operation for refueling the pressure tank 111 takes place.

The method 200 comprises determining 201 whether a refueling operation for refueling the pressure vessel 111 at a fuel station 120 has taken place with or without a communication link 103 between the vehicle 110 and the fuel station 120. The vehicle 110 can be any first vehicle 110 from a plurality of different vehicles 110. The fuel station 120 can be any first fuel station 120 of a plurality of different fuel stations 120. In particular, it can be determined whether COM refueling or non-COM refueling has taken place.

Furthermore, the method 200 comprises, depending on whether a refueling operation has taken place with or without a communication link 103, effecting 202 a measure for a subsequent refueling operation. A measure can be taken in particular when it has been recognized that a refueling operation has taken place without a communication link 103. As a measure in this case, in particular, the communication module 113, 123 of the vehicle 110 and/or of the fuel station 120 can be checked and, where applicable, repaired. A measure for a subsequent refueling operation for the vehicle 110 (potentially at another fuel station) and/or for the fuel station 120 (potentially for refueling another vehicle) can thus be effected.

The measures described in this document can be used to increase comfort when refueling and using a vehicle 110 with a pressure fuel tank 111. In particular, improved journey and/or range planning for vehicles 110 can be made possible by providing a database relating to the status of fuel stations 120. The information determined in relation to non-COM refueling can be used to detect defects at an early stage and rectify them, so that the quality of refueling operations can be increased. In a corresponding manner, faults in a vehicle 110 can also be detected and rectified. Such a fault can be detected in particular when multiple consecutive non-COM refueling operations have taken place at different fuel stations 120.

The present invention is not limited to the exemplary embodiments shown. In particular, it should be noted that the description and the figures are only intended to illustrate the principle of the proposed methods, devices and systems by way of example.

The invention claimed is:

1. A refuelling assistance device operable within a system comprising: a plurality of vehicles, including a first vehicle, each having a pressure tank that is refuellable with fuel via a refuelling operation, wherein the refuelling operation may occur at any of a plurality of fuel stations, including a first fuel station, with or without a communication link between the first vehicle and the first fuel station, the device comprising:
a control unit configured to:
determine that consecutive refuelling operations of the first vehicle at corresponding different fuel stations of the plurality of fuel stations have taken place without the communication link;
determine that consecutive refuelling operations at the first fuel station for corresponding different vehicles of the plurality of vehicles have taken place without the communication link;
in response to determining that consecutive refuelling operations of the first vehicle at corresponding different fuel stations of the plurality of fuel stations have taken place without the communication link, cause a communication module of the first vehicle to be checked for establishment of the communication link; and
in response to determining that consecutive refuelling operations at the first fuel station for corresponding different vehicles of the plurality of vehicles have taken place without the communication link, cause a communication module of the first fuel station to be checked for establishment of the communication link.

2. The device according to claim 1,
wherein the device forms part of the first vehicle, and
wherein the device is configured to receive refuelling operation data relating to whether the refuelling operation has taken place with or without a communication link between the first vehicle and the first fuel station from the first fuel station or from a central unit for a network of the plurality of fuel stations.

3. The device according to claim 1, wherein the control unit is further configured to:
determine an identifier of the first vehicle, position data relating to a position of the first fuel station and/or a time stamp relating to a point in time of the refuelling operation; and
transmit the identifier, the position data and/or the time stamp to the first fuel station or the central unit in order to obtain the refuelling operation data.

4. The device according to claim 1,
wherein the first fuel station comprises one or more fuel station sensors which are configured to collect sensor data relating to the fuel which is provided in the refuelling operation;
wherein the first vehicle comprises one or more vehicle sensors which are configured to collect sensor data relating to a filling level and/or a filling pressure of the pressure tank; and
wherein the device is configured to check and/or calibrate the one or more vehicle sensors on the basis of the sensor data from the one or more fuel station sensors.

5. The device according to claim 1, wherein the device is configured to:
determine pressure data relating to a filling pressure of the pressure tank following the refuelling operation;
determine temperature data related to a temperature of the fuel in the pressure tank; and
determine on the basis of the pressure data and on the basis of the temperature data whether a refuelling operation has taken place with or without a communication link between the first vehicle and the first fuel station.

6. The device according to claim 1,
wherein the communication link between the first vehicle and the first fuel station allows communication in accordance with SAE J2601 and/or SAE J2799, and/or wherein the fuel comprises $H_2$.

7. The device according to claim 1, wherein the communication link between the first vehicle and the first fuel station comprises an infrared communication link.

8. The device according to claim 1, wherein the control unit is further configured to:
determine zero, one or more indicators relating to premature termination of the refuelling operation; and
on the basis of the zero, one or more indicators, determine whether a refuelling operation has taken place with or without a communication link between the first vehicle and the first fuel station.

9. A refuelling assistance method useable within a system comprising: a plurality of vehicles, including a first vehicle, each having a pressure tank that is refuellable with fuel via a refuelling operation, wherein the refuelling operation may occur at any of a plurality of fuel stations, including a first fuel station, with or without a communication link between the first vehicle and the first fuel station, the method comprising:
determining one of the following scenarios:
(a) that consecutive refuelling operations of the first vehicle at corresponding different fuel stations of the plurality of fuel stations have taken place without the communication link, and
(b) that consecutive refuelling operations at the first fuel station for corresponding different vehicles of the plurality of vehicles have taken place without the communication link;
in response to determining scenario (a), cause a communication module of the first vehicle to be checked for establishment of the communication link; and
in response to determining scenario (b), cause a communication module of the first fuel station to be checked for establishment of the communication link.

* * * * *